(12) United States Patent
Chang

(10) Patent No.: US 7,609,513 B2
(45) Date of Patent: Oct. 27, 2009

(54) PORTABLE ELECTRONIC DEVICE

(75) Inventor: Cheng-Lung Chang, Tainan Hsien (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 55 days.

(21) Appl. No.: 11/933,967

(22) Filed: Nov. 1, 2007

(65) Prior Publication Data

US 2008/0273296 A1 Nov. 6, 2008

(30) Foreign Application Priority Data

May 4, 2007 (TW) .............................. 96115848 A

(51) Int. Cl.
*H05K 7/20* (2006.01)
(52) U.S. Cl. .................. 361/679.46; 361/705; 361/707; 361/708; 361/714; 455/575.1; 126/263.01; 126/263.02
(58) Field of Classification Search ......... 361/702–712, 361/714, 752, 831; 219/209, 221, 226–228, 219/476, 478, 520–522, 531–538, 552; 455/550.1, 455/575.1, 556.2, 575.3, 575.8; 428/323, 428/408, 504 H; 174/50, 50.1; 312/223.2, 312/223.3
See application file for complete search history.

(56) References Cited

U.S. PATENT DOCUMENTS

| | | | | |
|---|---|---|---|---|
| 3,976,049 | A * | 8/1976 | Yamashita et al. | 126/263.02 |
| 4,819,612 | A * | 4/1989 | Okamoto et al. | 126/263.01 |
| 6,324,055 | B1 * | 11/2001 | Kawabe | 361/687 |
| 6,876,875 | B2 * | 4/2005 | Shimazaki et al. | 455/575.1 |
| 6,878,902 | B2 * | 4/2005 | Lyle et al. | 219/209 |
| 7,186,958 | B1 * | 3/2007 | Nelson | 219/533 |
| 7,327,559 | B2 * | 2/2008 | Fox | 361/680 |
| 2002/0088455 | A1 * | 7/2002 | Tigneres | 126/263.01 |
| 2003/0139142 | A1 * | 7/2003 | Wang | 455/67.1 |
| 2004/0178384 | A1 * | 9/2004 | Usui | 252/76 |
| 2006/0148407 | A1 * | 7/2006 | Lin | 455/66.1 |
| 2006/0240260 | A1 * | 10/2006 | Heino et al. | 428/408 |
| 2007/0006870 | A1 * | 1/2007 | Danforth | 126/263.02 |
| 2007/0267583 | A1 * | 11/2007 | Dodo | 250/493.1 |
| 2008/0151503 | A1 * | 6/2008 | Aapro et al. | 361/714 |

* cited by examiner

*Primary Examiner*—Michael V Datskovskiy
(74) *Attorney, Agent, or Firm*—Steven M. Reiss

(57) ABSTRACT

A portable electronic device includes a cover (10), a container (20) and a heater (40). The container is provided on the cover. The heater includes some exothermic materials. The heater is received in the container.

18 Claims, 4 Drawing Sheets

PORTABLE ELECTRONIC DEVICE

BACKGROUND OF THE INVENTION

1. Field of the Invention

The present invention relates to portable electronic device, and more specifically to a portable electronic device with a heating part.

2. Description of Related Art

With the development of the technology of information processing, portable electronic devices such as mobile phones and PDAs (personal digital assistants) are commonly used around the world. Some high-end portable electronic devices are developed to be increasingly multi-functional. Many of these portable electronic devices are now equipped with new functional modules. These electronic devices bring convenience to its users anytime and anywhere. A mobile phone is a typical example.

However, when the portable electronic device is being used under a relatively low temperature environment, hands of a user may feel cold exposed in air. Usually, people employ some type of garment such as gloves to keep the hands warm, but, wearing gloves can interfere with operating the mobile phone, which makes it inconvenient for mobile phone user.

Therefore, a portable electronic device with a heating part is desired.

SUMMARY

A portable electronic device includes a cover, a container and a heater. The container is provided on the cover. The heater includes some exothermic materials. The heater is received in the container.

Other advantages and novel features of the present invention will become more apparent from the following detailed description of preferred embodiment when taken in conjunction with the accompanying drawings.

BRIEF DESCRIPTION OF THE DRAWINGS

Many aspects of the present portable electronic device can be better understood with reference to the following drawings. The components in the drawings are not necessarily drawn to scale, the emphasis instead being placed upon clearly illustrating the principles of the present portable electronic device. Moreover, in the drawings, like reference numerals designate corresponding parts throughout the several views.

DETAILED DESCRIPTION OF THE EMBODIMENT

Figure 1:
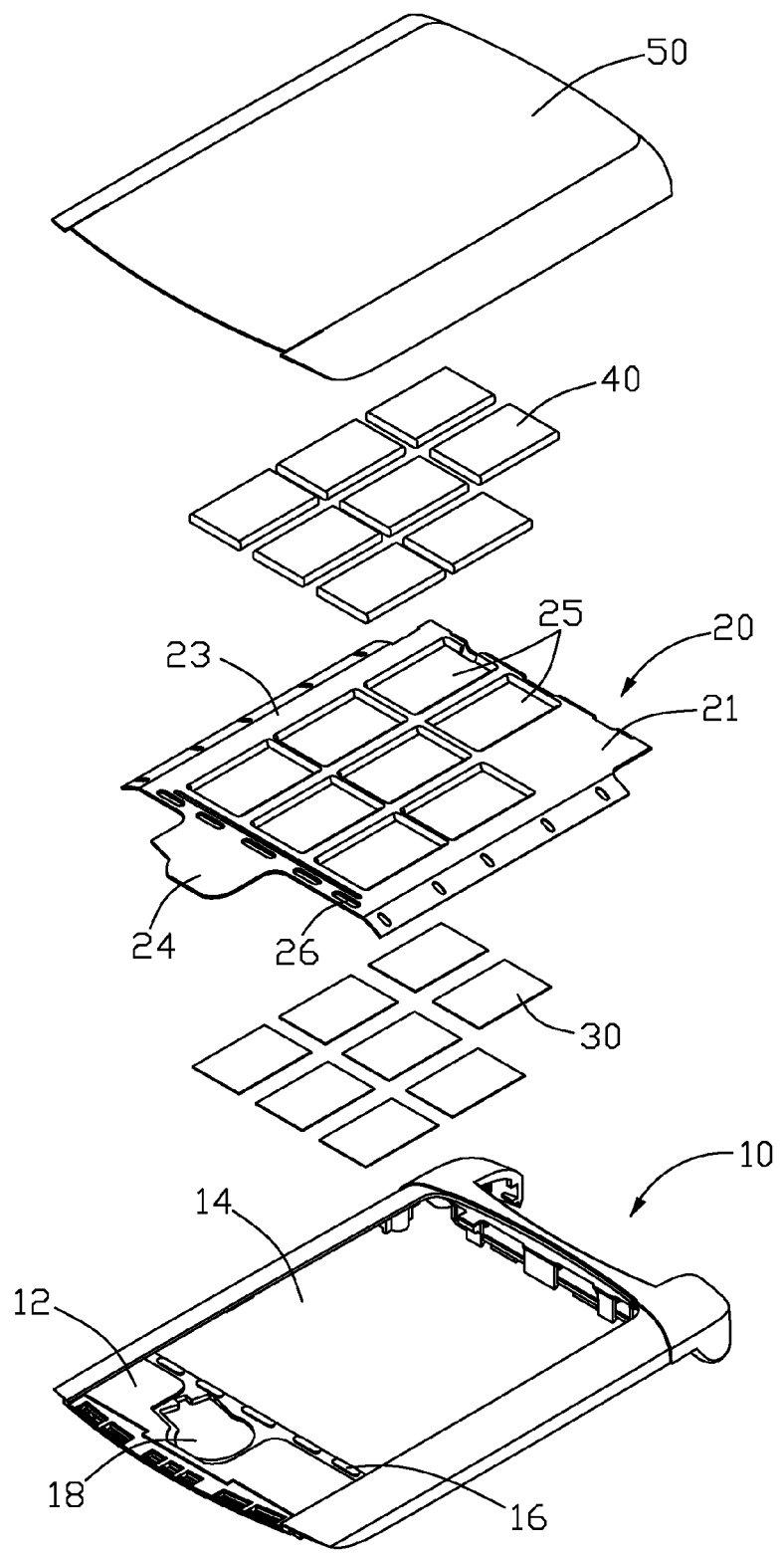
FIG. 1 is an exploded, isometric view of a portable electronic device having a heating part, in accordance with a preferred embodiment.
Figure 2:
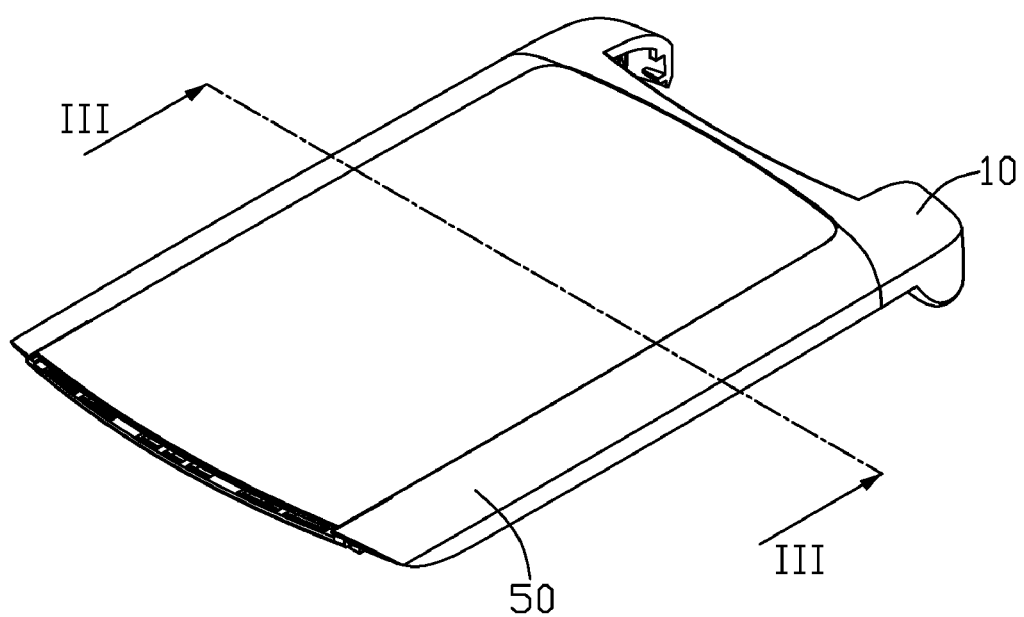
FIG. 2 is an assembled view of a portable electronic device having a heating part provided in FIG. 1.
Figure 3:
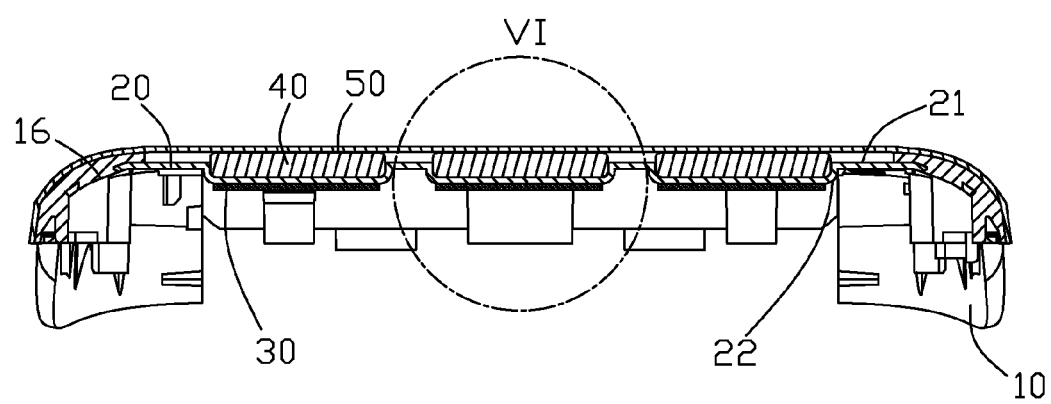
FIG. 3 is a cross-sectional view taken along line III-III of FIG. 2.

Referring to the FIGS. 1-3, a present embodiment of a portable electronic device is a mobile phone. The mobile phone includes at least one cover 10 and a heating part (not labeled) cooperating with the cover 10. The heating part includes a container 20, a radiator 30, a heater 40 and a heat sink 50.

A trough 12 is defined in an outer surface of the cover 10. A hatch 14 is defined in a base of the trough 12. A plurality of positioning protrusions 16 is provided around the hatch 14 on the base of the trough 12 or the inner surface of the cover 10. A latching slot 18 is defined in the base of the trough 12 adjacent to one end of the hatch 14.

The container 20 is made of a board in accordance with the cover 10 for its shape and size. The container 20 has a first surface 21 and a second surface 22 opposite to the first surface 21. The container 20 includes a containing portion 23 and a latch 24 extending from an end of the containing portion 23. A size of the containing portion 23 cooperates with the hatch 14. A position of the latch 24 in the container 20 corresponds with a position of the latching slot 18 in the cover 10. The latch 24 cooperates with the latching slot 18. A plurality of receiving grooves 25 is defined in both the containing portion 23 and the first surface 21 of the container 20. A plurality of positioning holes 26 is defined in the edge of the container 20 and around the containing portion 23. A distribution of the positioning holes 26 corresponds to a distribution of the positioning protrusions 16 on the cover 10. Each of the positioning holes 26 cooperates with each of the corresponding positioning protrusions 16.

The radiator 30 is fixed on the area of the plurality of receiving grooves 25 on the second surface 23 of the container 20. The radiator 30 can be at least one radiating sheet. The radiator 30 is provided for radiating superfluous heat through the cover 10. In addition, the radiator 30 is provided for shock absorption when the mobile phone is dropped unexpectedly.

The heater 40 includes some exothermic materials therein. The exothermic materials are nanometer iron powder, nanometer magnesium powder, activated carbon, vermiculite, and metallic salt (such as copper sulfate, etc.). The nanometer iron powder, nanometer magnesium powder, activated carbon, vermiculite, and metallic salt are provided in a certain proportion. The iron powder and the magnesium powder can be replaced with some other reactive metal powder. The oxidation of the reactive metal powder can increase the temperature and preserve heat. The activated carbon is provided for absorbing enough oxygen to fasten an oxidation of the metal power. The vermiculite is made by adiabatic material to enhance heat preservation. The metallic salt is provided as oxidizer to oxidize the metal powder.

The heat sink 50 is made by elastic material. The heat sink 50 is coated on the cover 10 to shield the container 20 and to conduct heat. A shape and size of the heat sink 50 is identical to the cover 10. The heat sink 50 is detachably mounted on the cover 10. The heat sink 50 and the cover 10 are fixed through glue laminating or fusion laminating. The heat sink 50 and the cover 10 can be fixed repetitiously.

Figure 4:
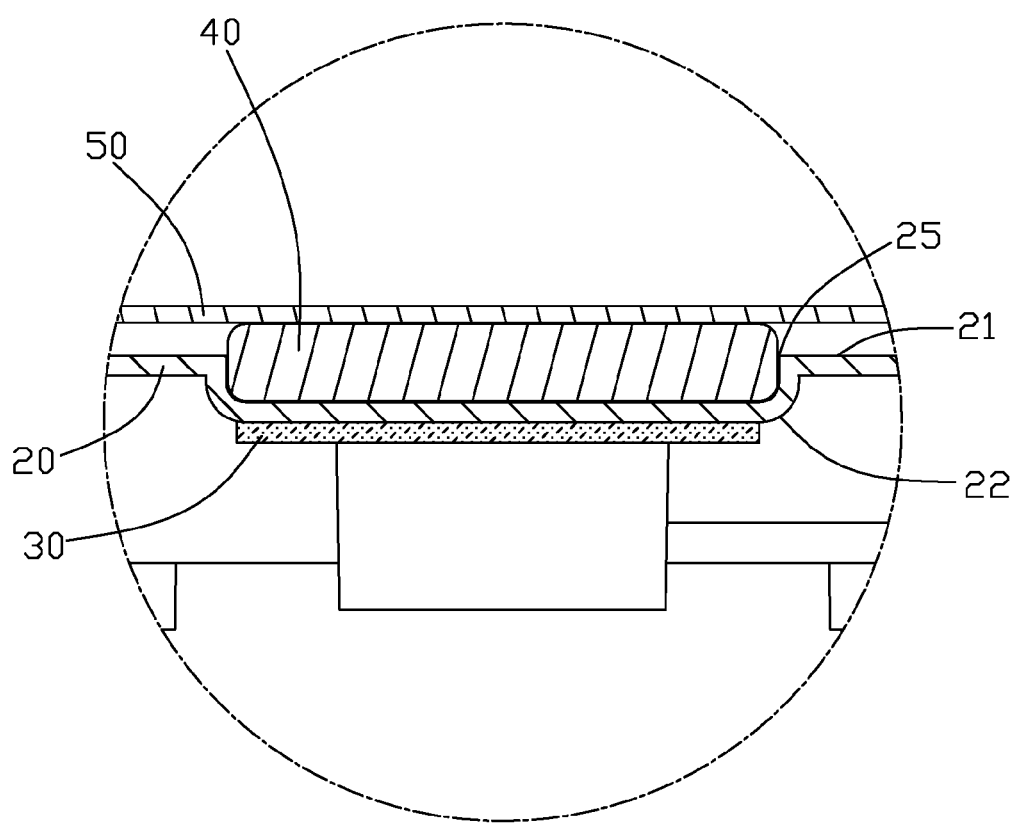
FIG. 4 is a enlarged sectional view of area VI of FIG. 3.

Further referring to the FIGS. 2-4, in assemble, the radiator 30 is fixed on the area of the plurality of receiving grooves 25 on the second surface 23 of the container 20. The container 20 is mounted on the cover 10 together with the radiator 30. Each of the positioning holes 26 in the container 20 is placed over each corresponding positioning protrusions 16 on the cover 10. The latch 24 and the latching slot 18 are snapped together to fix the container 20 and the radiator 30 with each other. The heater 40 is deposited in the receiving grooves 25 of the container 20. The heat sink 50 is fixed on the outer surface of the cover 10, so as to shield the container 20 and prevent the heater 40 from dropping from the container 20.

In use, with the force of the user's hand(s), the exothermic materials of the heater 40 generate heat energy by mutual friction so as to realize heat preservation. The size of the heater is set to correspond with a width of the user's fingers or hand, so that the user can absorb the heat energy by holding the portable electronic device with his/her hand.

It should be understood, the cover 10 can be a battery cover of the mobile phone. The container 20 and the cover 10 can be united as a whole, and the containing portion 23 is set on the cover 10. The radiator 30 can be omitted, and the part of the containing portion 23 on the second surface 22 of the container 20 can be made from heat rejection materials. In addition, the heat sink 50 can be omitted, and the heater 40 can be fixed on the container 20. Besides a mobile phone, The portable electronic device can also be a PDA (personal digital assistant), a digital camera, etc.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
   a cover;
   a container provided on the cover, a trough defined in an outer surface of the cover, a hatch defined in a base of the trough; and
   a heater including exothermic materials, the heater being received in the container.

2. The portable electronic device as described in claim 1, wherein a size of the container is according to a size of the cover, and the container includes a containing portion whose size cooperates with that of the hatch.

3. The portable electronic device as described in claim 2, wherein a plurality of positioning protrusions is provided around the hatch on the cover, a plurality of positioning holes is defined on the container and around the containing portion, the distribution of the positioning holes corresponds to the positioning protrusions on the cover, each of the positioning holes cooperates with the each corresponding positioning protrusions.

4. The portable electronic device as described in claim 3, wherein a latching slot is defined in one end of the cover, a latch extends from an end of the containing portion, the position of the latch in the container corresponds with the position of the latching slot in the cover, and the latch cooperates with the latching slot.

5. The portable electronic device as described in claim 4, wherein the container has a first surface and a second surface opposite to the first surface, at least one receiving groove is defined in the first surface of the container, and the heater is received in the receiving groove.

6. The portable electronic device as described in claim 1, wherein the container and the cover are united as a whole.

7. The portable electronic device as described in claim 6, wherein the container has a first surface and a second surface opposite to the first surface, at least one receiving groove is defined in the first surface of the container, and the heater is received in the receiving groove.

8. The portable electronic device as described in claim 7, further comprising a radiator fixed on the area of the plurality of receiving grooves on the second surface of the container, and the radiator includes at least one radiating sheet.

9. The portable electronic device as described in claim 1, wherein the heater includes exothermic materials including a predetermined proportion of reactive metal powder, activated carbon, vermiculite, and metallic salt.

10. The portable electronic device as described in claim 9, wherein the reactive metal powder is iron powder or magnesium powder.

11. The portable electronic device as described in claim 1, further comprising a heat sink coated on the cover.

12. The portable electronic device as described in claim 11, wherein the heat sink is made by elastic material, a size of the heat sink is substantially identical to a size of the cover.

13. The portable electronic device as described in claim 12, wherein the heat sink is detachably mounted on the cover, the heat sink and the cover are fixed through glue laminating or fusion laminating, the heat sink and the cover can be fixed repeatedly.

14. A portable electronic device, comprising:
    a cover;
    a container provided on the cover, a trough being defined in an outer surface of the cover, and a hatch being defined in a base of the trough, a size of the container corresponding to a size of the cover, and the container including a containing portion of a size corresponding with the size of the hatch; and
    a heater including exothermic materials including a predetermined proportion of reactive metal powder, activated carbon, vermiculite, and metallic salt; the heater being received in the container.

15. The portable electronic device as described in claim 14, wherein a plurality of positioning protrusions is provided around the hatch on the cover, a plurality of positioning holes is defined on the container and around the containing portion, the distribution of the positioning holes corresponds to the positioning protrusions on the cover, each of the positioning holes cooperates with the each corresponding positioning protrusions.

16. The portable electronic device as described in claim 14, wherein a latching slot is defined in one end of the cover, a latch extends from an end of the containing portion, the position of the latch in the container corresponds with the position of the latching slot in the cover, and the latch cooperates with the latching slot.

17. The portable electronic device as described in claim 14, wherein the container has a first surface and a second surface opposite to the first surface, at least one receiving groove is defined in the first surface of the container, and the heater is received in the receiving groove.

18. The portable electronic device as described in claim 17, further comprising a radiator fixed on the area of the plurality of receiving grooves on the second surface of the container, and the radiator includes at least one radiating sheet.

* * * * *